Aug. 6, 1968 W. D. SMITH 3,395,775
VIBRATION DAMPING COMPOSITE
Filed Nov. 12, 1965 3 Sheets-Sheet 1

INVENTOR
WILLIAM DESBY SMITH

BY Strauch, Nolan, Neale,
Nies & Bronaugh
ATTORNEYS

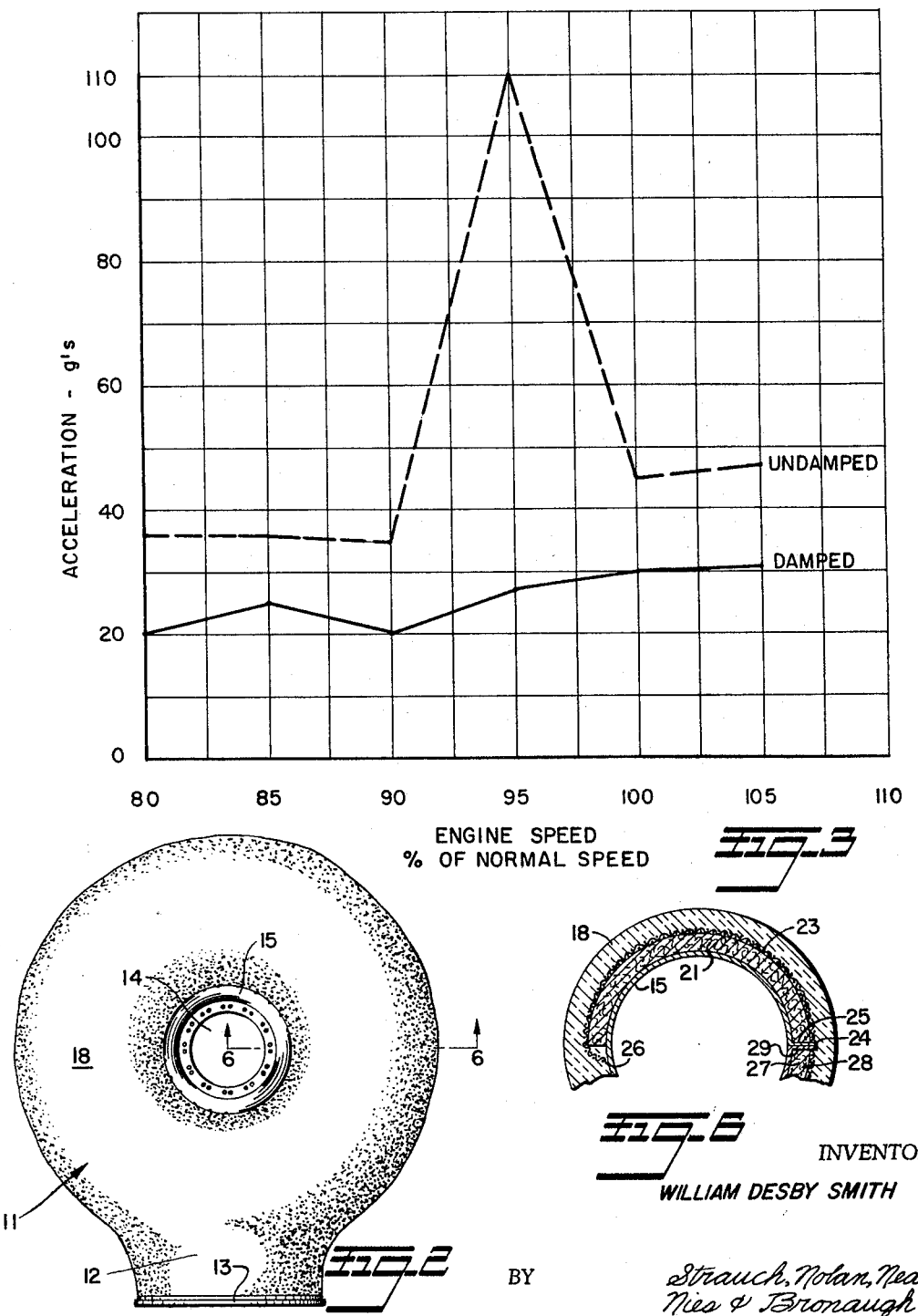

Aug. 6, 1968  W. D. SMITH  3,395,775
VIBRATION DAMPING COMPOSITE
Filed Nov. 12, 1965  3 Sheets-Sheet 3
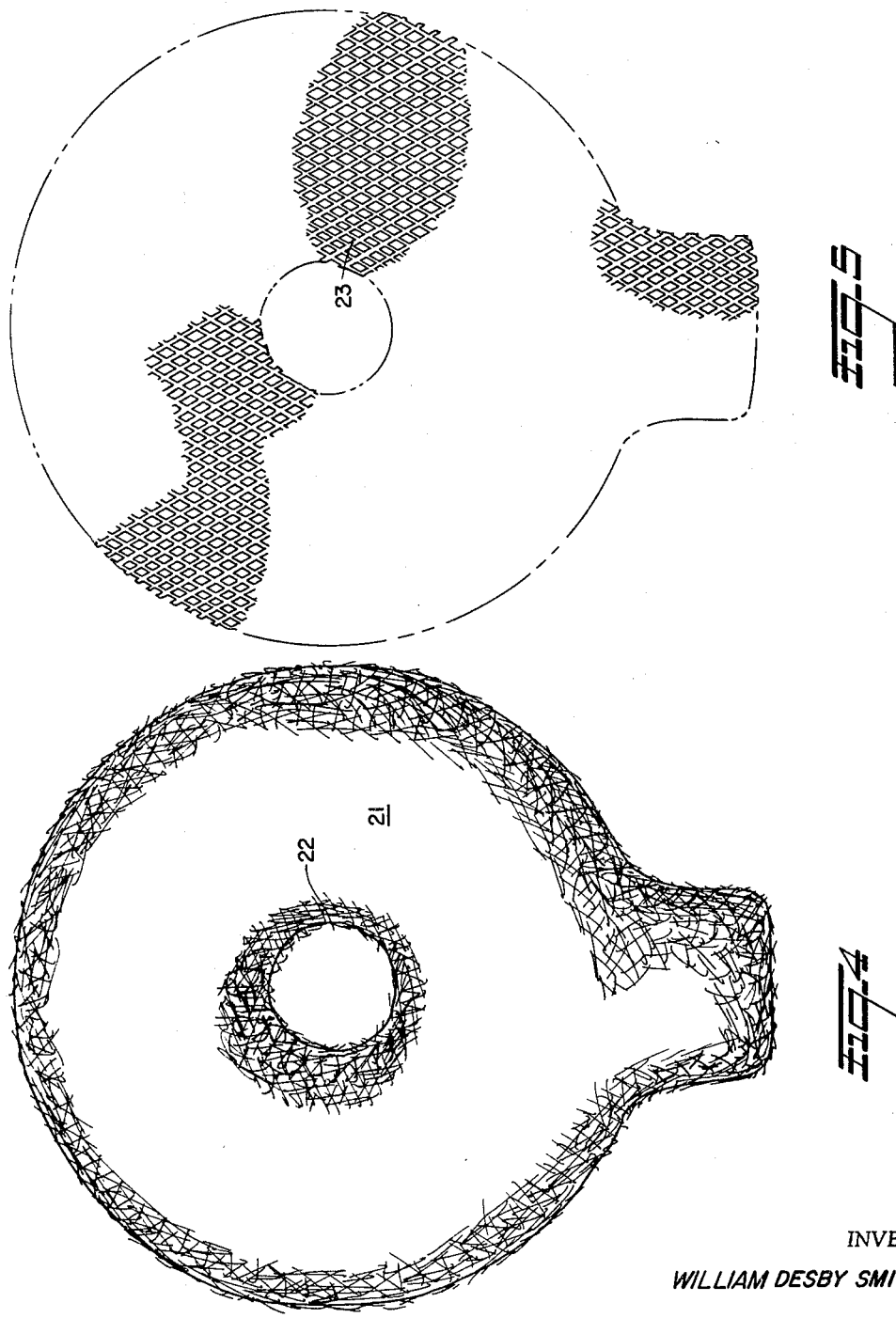
INVENTOR
WILLIAM DESBY SMITH
BY Strauch, Nolan, Neale,
Nies & Bronaugh
ATTORNEYS 3,395,775
VIBRATION DAMPING COMPOSITE
William Desby Smith, San Diego, Calif., assignor to Solar, a Division of International Harvester Co., San Diego, Calif., a corporation of New Jersey
Filed Nov. 12, 1965, Ser. No. 507,310
10 Claims. (Cl. 181—33)

The present invention relates generally to vibration and acoustic damping coatings for metallic structures, more particularly to foamed, fiber reinforced resin coating for damping vibrations in such metallic structures. Specifically, it relates to a new and useful coating that retains excellent ability to dampen vibration, attenuate sound, and provide thermal insulation through a wide range of low and high temperatures.

The invention provides a heat cured, foamed, viscoelastic composite comprising an organosyloxane resin binder with an inorganic fiber reinforcement, and also includes novel slurries and sheets or tapes for use in making the composite damping coating.

It is well known that mechanical devices subject to vibration frequently experience structural failures due to fatigue, and a number of fiber-resin damping compounds have been offered to solve the problem. However, no such known coating is useful above 300° F., and many become brittle and fail at temperatures below 30° F. Such known composites or coatings are of little value, for example, when applied to the compressor scrolls and exhaust collectors of gas turbines operating in cold climates where scrolls and collectors may reach temperatures of 800° F. and above during operation, and fall to temperatures as low or lower than minus 70° F. when the machine is not operating.

Therefore, a primary object of the present invention is the provision of a comparatively inexpensive viscoelastic composite which when applied and bonded to metallic devices subject to vibrations, effectively dampens vibrations, provides excellent thermal insulation and substantially reduces vibration induced noise throughout a temperature range of substantially minus 70° F. to plus 800° F.

Another important object of the invention is to provide the composite in a form such that it may be applied to the metal structure in a number of ways such as by spraying, trowelling, or as a pressure sensitive tape.

Another object is to provide a composite of comparative light weight which, when applied to a metal base and heat cured, develops structural integrity therewith.

Still another object is provision of a composite which is cured in a temperature range of 300–500° F., yet provides the recited advantages and retains its viscoelasticity through a temperature range of substantially minus 70° F. to plus 800° F.

Yet another object is to provide a damping material which when applied to resonant vibration points of metallic structures will render sheet or other thin metal acoustically equivalent to lead.

I some cases temperatures substantially higher than 800° F. are encountered and it is still another object of this invention to provide a structure wherein a heat insulating sheet or blanket is firmly held against the hot body by a metallic wire screen or the like, to which the composite is applied and cured, to obtain the necessary vibration dampening and further heat insulation.

These and other objects and advantages of the invention will become apparent from the following specification taken in conjunction with the appended claims and the annexed drawings, in which:

FIGURE 2 is a pictorial view to a slightly reduced scale, of the other side of the exhaust collector shown in FIGURE 1.

FIGURE 3 is a chart showing the relative vibration of an uncoated gas turbine exhaust collector and one which has been coated in accordance with one embodiment of the invention.

FIGURE 4 is a view in side elevation of a mat formed of a sheet or blanket of glass fiber shaped so that it may be pressed and held against the outer surface of one side of a gas turbine exhaust collector in accordance with one embodiment of the invention.

FIGURE 5 is a pictorial view of a wire mesh form for covering a mat such as shown in FIGURE 4 and holding it against one side of a gas turbine exhaust collector.

FIGURE 6 is a partial view of a section taken substantially along the line 6—6 of FIGURE 2.

Figure 1:
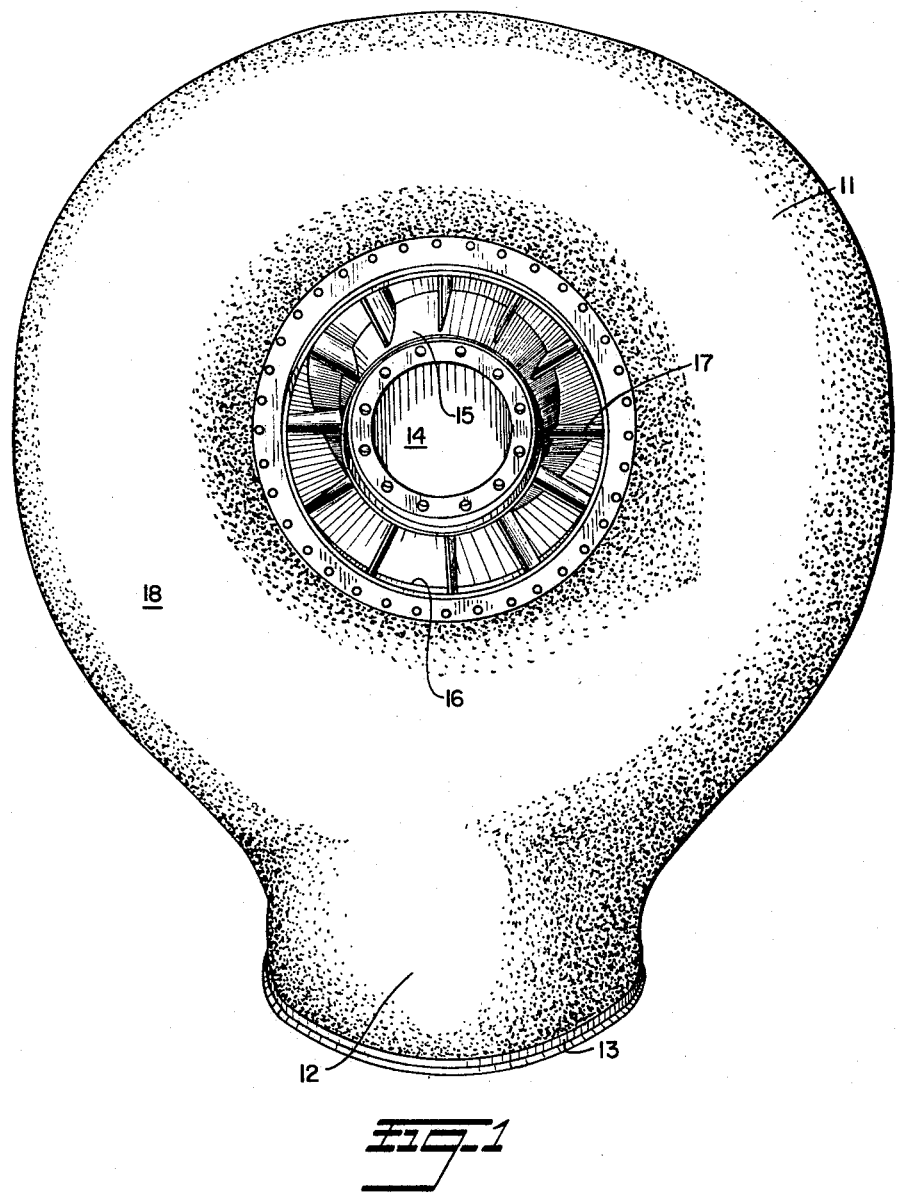
FIGURE 1 is a pictorial view substantially in side elevation of one side of the exhaust collector of a gas turbine to which a coating in accordance with the present invention has been applied.

Briefly, the invention provides a composite of an organosyloxane resin dissolved in an aromatic hydrocarbon solvent, with addition of a small amount of an organic synthetic blowing agent and a suitable reinforcement of an inorganic fiber; which is applied to a metallic part subject to resonant vibrations, heat cured on such part, and which renders such part acoustically equivalent to lead, while providing excellent thermal insulation where required.

The basic composite may be provided in the form of a slurry suitable for spraying or trowelling by the following steps:

(1) One and one-half parts by weight of an organosiloxane resin are dissolved in a like amount of an aromatic hydrocarbon solvent. (2) Up to two percent by weight of an organic synthetic blowing agent is added. (3) One part by weight of a chopped fiber inorganic reinforcement is added, and the batch is thoroughly mixed manually or by means of a mechanical mixer.

The resin is a thermosetting synthetic silicone of the aromatic soluble type, that is, a silicone characterized by silicon and oxygen linked together in the siloxane bond with the basic structure modified by replacing the hydrogen atoms with hydrocarbon radicals.

The solvent may be any of the aromatic hydrocarbon solvents such as xylene or toluene, and the amount of solvent may be varied within reasonable limits to provide viscosity suitable for the desired application method. That is, a greater amount of solvent will produce a free-flowing slurry suitable for spray application, while a lesser amount of solvent will produce a thick, viscous dough-like mass which may be applied to the workpiece with a trowel.

The blowing agent may be any of the organic or inorganic blowing agents available, although it is preferred to utilize an organic synthetic resin which, upon decomposition during heat curing, releases an inert gas such as nitrogen. The trademarked Celogen (p, p¹-oxybis-(benzene sulfonyl hydrazide) is well suited to the requirement. The composite without a blowing agent tends to foam during curing, but the foaming is of a limited nature such that undesirable gas pockets may remain in the cured bond. Therefore, the blowing agent is included to assure that foaming will continue to the point where the coating will be essentially degassed.

The inorganic reinforcement may consist of fibers of aluminum oxide or silicon oxide, or mixtures thereof with the fibers having a diameter in the range of from submicron to 10 microns and a length of from one-fourth to one-half inch.

The above described uncured basic composite has an indefinite shelf life and may be stored for months with no deleterious effects.

For convenience of storage and later use, it has been found that the uncured composite may be readily shaped into a sheet of or tape of suitable thickness, say one-fourth to one-half inch, and heat may be applied to one side to effect a partial cure such that this side will lose its tacky characteristic while the other side will remain tacky and thus pressure sensitive when applied to a metal surface. The sheet or tape may then be rolled upon itself or on a spool with a suitable non-adhering film such as polyethylene or a waxed paper covering the tacky side. The same rolled sheet or tape effect may be obtained by procuring the aluminum or silicon oxide fiber reinforcement as a non-woven sheet or tape, immersing such sheet or tape in a slurry composed of the siloxane resin dissolved in a suitable solvent with the blowing agent addition, applying heat to a surface of the impregnated sheet or tape to effect partial curing, and rolling as above recited.

As a specific example of the invention, a batch was prepared as follows:

Three pounds of an organosiloxane resin were dissolved in three pounds of an aromatic hydrocarbon solvent (Xylene). Twenty-three grams of an organic synthetic resin blowing agent (Celogen) was added. Two pounds of chopped inorganic fibers, in this case 50 percent aluminum oxide and 50 percent silicon oxide (Fiberfrax) were mixed in. The resultant composite was a doughy, tacky mass.

The mixture was applied by trowel to a workpiece, which in the illustrated example is the outer surface of the gas collector of a gas turbine, to a thickness of one half inch and then the coating was cured by placing the coated collector in an oven at 500° F. for 15–20 minutes.

For an understanding of the general structure of the exhaust collector ring shown in FIGURES 1 and 2, reference may be made to the Patent No. 2,713,990, issued July 26, 1955 to L. R. Wosika for Exhaust Structure For Gas Turbine. As in that patent, the collector ring, indicated generally by the reference number 11, and formed of sheet metal, has an external configuration that is substantially doughnut shaped but is hollow inside as shown in the aforesaid patent. It has a radial outlet indicated at 12, terminating in a ring 13 to which ducting may be attached.

The side of the exhaust collector ring shown in FIGURE 1 faces the exhaust discharge end of the gas turbine, and the side shown in FIGURE 2 faces in the other direction and has a central inlet 14 for atmospheric air, formed by an inner annular wall 15. The atmospheric air discharges into the annular space between the inner annular wall 15 and an outer annular wall 16 (FIGURE 1) that is separated from the inner annular wall 15 by support and guide vanes 17. Hot exhaust gases from the gas turbine discharge into the same space, all as described in the aforesaid patent to Wosika.

Prior to coating with the composite 18, the collector was subject to destructive resonant vibrations which resulted in frequent fatigue failures involving cracking. Following the coating and curing operations, the collector 11 was assembled into a gas turbine assembly which was subsequently run for 1000 hours. The following data were recorded:

(1) Density of the coating before curing was 1.26.
(2) Density of coating after curing was 0.35.
(3) Examination of the collector after 1000 hours operation revealed no cracking or other vibratory damage.
(4) Temperature of base metal during operation was 800° F.
(5) Temperature at surface of coating during operation after 10 hours was 200° F., and after 1000 hours operation was only 275° F.
(6) Shore hardness of coating after 10 hours operation was 40D which increased to 65D at 1000 hours of operation.
(7) At intervals during the run, the engine was shut down and the temperature in the cold room reduced to −80° F. with no discernable deleterious effects on the coating.

FIGURE 3 shows two curves giving the vibration of the exhaust collector of FIGURES 1 and 2, plotted in terms of acceleration in g's versus engine speed. The vibration of the undamped collector is shown in the upper dotted line, which shows how the shell resonated and vibrated severely at 95% normal engine speed. The lower solid line shows how after coating in the manner described above the resonant condition was completely damped and the amount of vibration of the collector at all engine speeds was reduced by at least one-third.

While FIGURES 1 and 2 illustrates an embodiment of the invention wherein substantially the entire surface of the body to be damped is covered with the composite 18, such a complete covering is not necessary except in cases where thermal insulation is needed. For attenuation of vibration or sound the composite may be applied in patches on the surface of the body. Such patches may be trowelled on or they may be in the form of pieces of the previously described tape having their tacky side applied to the body. In either case of course, it is cured after having been applied. The fact that it may be applied in patches makes it effective for use where interfering machine parts prevent application of a complete coating.

The test described below illustrates the effectiveness of the composite when applied as a patch to a portion of a surface of a metallic body.

A comparison test was made to determine the effect on the rate of decay of the sound pressure level which was generated by striking short metal tubes with a mallet. One of the tubes had a small patch of composite attached to its surface, while the surface of the other tube was absolutely plain. The patch was a piece of the previously described tape.

Although this test was only a qualitative check, it was evident by observing the output of a crystal microphone on an oscillographic trace that the patch of composite had decreased the decay time by a factor of 25.

The two identical metal tubes, 2½ inches in diameter by 7 inches in length with a wall thickness of ⅛ inch which were used in this test were fabricated from AISI-321 material. The one tube had an absolutely plain surface and the second tube had a patch of composite approximately 1 square inch in area and one eight inch thick, bonded to the outer surface of the tube at a position approximately 1½ inch from the top of the tube. A crystal microphone was positioned 1 foot from each tube during the test. Each tube in turn was struck a sharp blow with a mallet. The output of the microphone was recorded on the trace paper of a recorder.

An analysis of these output traces showed that the decay time of the sound pressure level for the plain tube was approximately 2 seconds, while the decay time for the tube with the composite patch was approximately 0.07 second.

Although this data is only qualitative, it is evident that the sound absorption coefficient (accoustical impedance) for the composite is high. In addition, experience in the use of the composite in turbine applications has indicated that the absorption coefficient for this material is not frequency dependent. The wide temperature range of from substantially minus 70° F. to plus 800° F. throughout which it maintains its viscoelasticity makes it an effective vibration and acoustic damping as well as heat insulating coating.

FIGURES 4, 5 and 6 illustrate an embodiment of the invention that is particularly useful in the vibration and acoustic damping for metallic structures that become heated above 800° F. This embodiment is also illustrated as applied to a gas turbine exhaust collector ring similar to that of FIGURES 1 and 2. In this embodiment a layer of fiber glass matting is placed against the workpiece, such as an exhaust gas collector ring, and is held thereagainst by a wire mesh cage which is secured, as by spot welding, to various portions of the workpiece. Then the composite is applied over the wire mesh, preferably by trowelling, until it is sufficiently thick, and the entire assembly is heat cured as previously described. In this embodiment the fiber glass is prinicpally a heat insulator, the vibrations of the workpiece being transmitted to the wire mesh cage through the points where it is secured to the workpiece, and the cured composite serving as before to dampen vibration, attenuate sound and provide thermal insulation. Instead of being troweled on, the composite may be in the form of the previously described sheet or tape, which may be pressed against the wire mesh cage and trimmed away as necessary.

The thickness of the fiber glass matting held against the workpiece is not critical and may range from one-eighth of an inch to half an inch, depending upon the working temperature of the workpiece. Whether the composite is trowelled on or applied as a sheet to the wire cage, it will flow between and around the wires forming the mesh cage so that the wires are imbedded in the composite, and it will also contact the fiber glass matting beneath the cage.

FIGURE 4 shows a sheet or blanket 21 of fiber glass which has been shaped by forming it over one of the male dies used to stamp one of the two halves of an exhaust collector. It has also been trimmed and a central hole 22 cut out. The shaped and trimmed blanket of FIGURE 4 would fit against the side of the collector ring 11 of FIGURE 1 if it were bare and not coated with the composite 18.

FIGURE 5 shows a cage 23 of metallic wire mesh, such for example as expanded metal, and having sufficient rigidity to transmit vibrations, particularly when pre-formed as shown in FIGURE 5 to fit over the fiber glass mat 21 of FIGURE 4 to press it against the exhaust collector ring. The cage 23 may be a little larger in outer diameter and smaller in its inner diameter than the blanket 21 of FIGURE 4 so as to protrude beyond the outer and inner diameters of the blanket and provide portions that may be spot welded to the collector ring when the blanket 21 and cage 23 are assembled upon and pressed against the ring.

FIGURE 6 shows the blanket 21 and cage 23 pressed against one side of the collector ring. The cage 23 is spot welded at numerous outer peripheral points 24 to an outer radial flange 25 of the side of the collector ring shown in FIGURE 2. The inner periphery of the cage 23 is spot welded to the inner annular wall 15 of the collector ring at a number of points indicated at 26. The other side of the collector ring is similarly covered by a blanket 27 (FIGURE 6) and cage 28 which is spot welded at numerous points to a peripheral flange 29 on that side of the collector ring, and the inner periphery of cage 28 is spot welded at numerous points to the outer annular wall shown in FIGURE 1.

The placing of the mats and the cages, and the spot welding of the cages to the proper portions of the collector ring are most conveniently accomplished when the two halves of the collector ring have been secured together in the normal manner. Now the composite, as mixed in a manner previously described, is trowelled over the entire cage that holds the insulating blanket against the collector ring, until it has a suitable thickness, which may be up to one-half inch or more, depending upon the sound and vibration attenuation, and heat insulation desired. The wire mesh of the cage will thus be imbedded in the composite, which will flow around and between the meshes of the wire forming the cage. The entire covered and coated collector ring is then cured in an oven at a temperature of 500° F. for 15–20 minutes as in the embodiment wherein no insulating blanket and cage are used. The final appearance will be similar to the coated ring of FIGURES 1 and 2 except that the assembly will be fatter because of the additional thickness of the insulating blanket.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A composition adapted to be cured to a heat insulating and vibration damping substance, said composition comprising a generally homogeneous mixture consisting essentially of on the order of one and one-half parts by weight of a viscoelastic organosyloxane resin, on the order of one and one-half parts by weight of an aromatic hydrocarbon in which said resin is soluble, on the order of one part by weight of a fibrous, inorganic filler, and on the order of one five-hundredth part by weight of an organic blowing agent.

2. A heat insulating and vibration damping material which is the heat cured product obtained from a generally homogeneous mixture consisting essentially of on the order of one and one-half parts by weight of a viscoelastic organosyloxane resin, on the order of one and one-half parts by weight of an aromatic hydrocarbon in which said resin is soluble, on the order of one part by weight of a fibrous, inorganic filler, and on the order of one five-hundreth part by weight of an organic blowing agent, the organosyloxane resin in said cured product being substantially free of cross linkages and thereby capable of retaining its viscoelasticity over a temperature range of from about minus 70 to about plus 800 degrees Fahrenheit.

3. As an article of manufacture, a heat insulating and vibration damping material in sheetlike form, said material comprising a sheetlike, fibrous, inorganic, reinforcing structure and a material impregnated in said reinforcing structure which is the partially heat cured product of a tacky, generally homogeneous mixture consisting essentially of on the order of one and one-half parts by weight of a viscoelastic organosyloxane resin, on the order of one and one-half parts by weight of an aromatic hydrocarbon in which said resin is soluble, on the order of one part by weight of a fibrous, inorganic filler, and on the order of one five-hundreth part by weight of an organic blowing agent, said heat insulating and vibration damping material being tacky on one side, whereby said material will adhere to a body against which it is pressed, and said material being substantially free of tackiness on the opposite side thereof, whereby said material can be readily handled.

4. The article of manufacture defined in claim 3, together with a covering of non-adhesive material on the tacky side of said heat insulating and vibration damping material to permit said last-mentioned material to be rolled upon itself.

5. As an article of manufacture, a heat insulating and vibration damping material in sheetlike form, said material being the partially heat cured product of a tacky, generally homogeneous mixture consisting essentially of on the order of one and one-half parts by weight of a viscoelastic organosyloxane resin, on the order of one and one-half parts by weight of an aromatic hydrocarbon in which said resin in soluble, on the order of one part by weight of a fibrous, inorganic filler, and on the order of one five-hundreth part by weight of an organic blowing agent, said material being tacky on one side whereby said material will adhere to a body against which it is pressed and said material being substantially free of tackiness on the opposite side thereof, whereby said material can be readily handled.

6. The article of manufacture defined in claim 5, together with a covering of non-adhesive material on the tacky side of said heat insulating and vibration damping material to permit said last-mentioned material to be rolled upon itself.

7. The combination of a body adapted to be heated to high temperatures and subject to failure from vibration and capable of producing vibration induced sound and an insulating layer capable of providing heat insulation and of damping said vibrations and thereby minimizing vibration induced fatigue and reducing the vibration induced sound, said insulating layer being a material which is the heat cured product obtained from a generally homogeneous mixture consisting essentially of on the order of one and one-half parts by weight of a viscoelastic organosyloxane resin, on the order of one and one-half parts by weight of an aromatic hydrocarbon in which said resin is soluble, on the order of one part by weight of a fibrous, inorganic filler, and on the order of one five-hundredth part by weight of an organic blowing agent, the organosyloxane resin in said cured product being substantially free of cross linkages and thereby capable of retaining its viscoelasticity over a temperature range of from about minus 70 to about plus 800 degrees Fahrenheit.

8. The combination of a body adapted to be heated to high temperatures and subject to failure from vibration and capable of producing vibration induced sound and an insulating composite capable of providing heat insulation and of damping said vibrations and thereby minimizing vibration induced fatigue and reducing the vibration induced sound, said insulating composite comprising a layer of fibrous, inorganic insulation covering the part of said body to be insulated, a metallic fabric of open mesh construction overlying said inorganic insulation, means for securing said fabric to said body and for transmitting vibrations from said body to a layer of a heat insulating and vibration damping material, said last-mentioned layer covering said fabric and being the heat cured product obtained from a generally homogeneous mixture consisting essentially of on the order of one and one-half parts by weight of a viscoelastic organosyloxane resin, on the order of one and one-half parts by weight of an aromatic hydrocarbon in which said resin is soluble, on the order of one part by weight of a fibrous, inorganic filler, and on the order of one five-hundreth part by weight of an organic blowing agent, said organosyloxane resin in said cured product being substantially free of cross linkages and thereby capable of retaining its viscoelasticity over a temperature range of from about minus 70 to about plus 800 degrees Fahrenheit.

9. The method of heat insulating a body and simultaneously damping vibration of said body to minimize vibration induced fatigue of and reduce vibration induced sound emanating from said body, said method comprising the steps of applying to said body a layer of an insulating material which is a generally homogeneous mixture consisting essentially of on the order of one and one-half parts by weight of a viscoelastic organosyloxane resin, on the order of one and one-half parts by weight of an aromatic hydrocarbon in which said resin is soluble, on the order of one part by weight of a fibrous, inorganic filler, and on the order of one five-hundreth part by weight of an organic blowing agent and heating said layer to a temperature in the range of about 300 to about 500 degrees Fahrenheit to cure said resin without the formation of a significant number of cross linkages, whereby said resin is capable of retaining its viscoelasticity and the insulating material its insulating and vibration damping properties over a temperature range of from about minus 70 to about plus 800 degrees Fahrenheit.

10. The method of heat insulating a body and simultaneously damping vibration of said body to minimize vibration induced fatigue of and reduce vibration induced sound emanating from said body, by applying a heat insulating and vibration and sound damping composite thereto, said method comprising the steps of applying a layer of fibrous, inorganic, heat insulating material to the surface of said body, covering said layer of inorganic insulating material with a metallic fabric of open mesh construction, securing said fabric to said body, covering said fabric with a layer of a composition which is a generally homogeneous mixture consisting essentially of on the order of one and one-half parts by weight of a viscoelastic organosyloxane resin, on the order of one and one-half parts by weight of an aromatic hydrocarbon in which said resin is soluble, on the order of one part by weight of a fibrous, inorganic filler, and on the order of one five-hundreth part by weight of an organic blowing agent, and heating said body to a temperature in the range of about 300 to about 500 degrees Fahrenheit to cure said resin without the formation of a significant number of cross linkages, whereby said resin is capable of retaining its viscoelasticity and the composite its insulating and vibration damping properties over a temperature range of from about minus 70 to in excess of 800 degrees Fahrenheit.

References Cited

UNITED STATES PATENTS

| | | | |
|---|---|---|---|
| 2,179,817 | 11/1939 | Eglinton et al. | 181—33 |
| 2,703,775 | 3/1955 | Panagrossi et al. | 260—2.5 |
| 2,886,721 | 5/1959 | Picozzi et al. | 181—33 |
| 2,902,379 | 9/1959 | McCollum et al. | 181—33 |
| 2,938,937 | 5/1960 | Shenk | 181—33 |
| 3,046,172 | 7/1962 | Reid | 181—33 |
| 3,112,810 | 12/1963 | Nallinger | 181—33 |
| 3,127,363 | 3/1964 | Nitzsche et al. | 260—2.5 |
| 3,193,049 | 7/1965 | Wollek | 181—33 |

FOREIGN PATENTS

| | | |
|---|---|---|
| 769,237 | 3/1957 | Great Britain. |
| 926,088 | 5/1963 | Great Britain. |

ROBERT S. WARD, JR. *Primary Examiner.*

UNITED STATES PATENT OFFICE
CERTIFICATE OF CORRECTION

Patent No. 3,395,775

August 6, 1968

William Desby Smith

It is certified that error appears in the above identified patent and that said Letters Patent are hereby corrected as shown below:

Column 1, line 27, "30°" should read -- 32° --; line 59, "I" should read -- In --. Column 4, line 45, "eight" should read -- eighth --. Column 5, line 55, after "wall" insert -- 16 --. Column 6, line 66, "in", second occurrence, should read -- is --.

Signed and sealed this 23rd day of December 1969.

(SEAL)

Attest:

Edward M. Fletcher, Jr.

Attesting Officer

WILLIAM E. SCHUYLER, JR.

Commissioner of Patents